Jan. 25, 1955     H. SCHRÖDER     2,700,323
INFRARED TRANSMITTING MIRROR
Filed Dec. 14, 1949
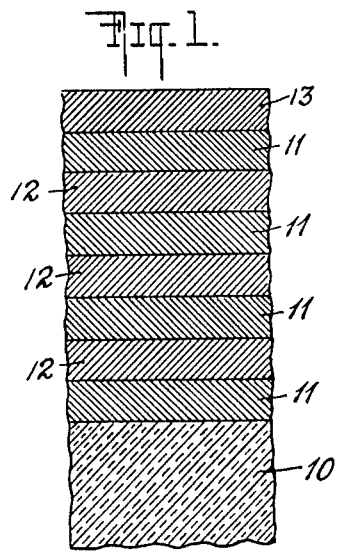
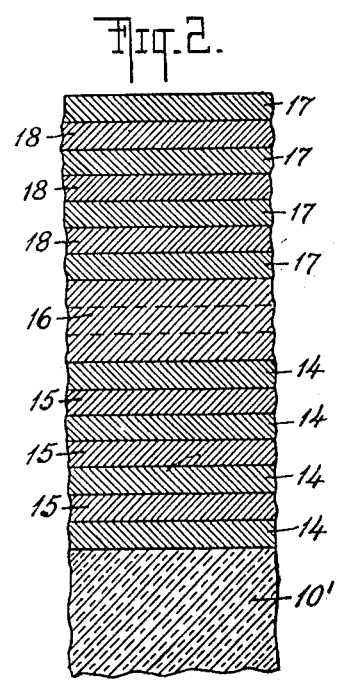
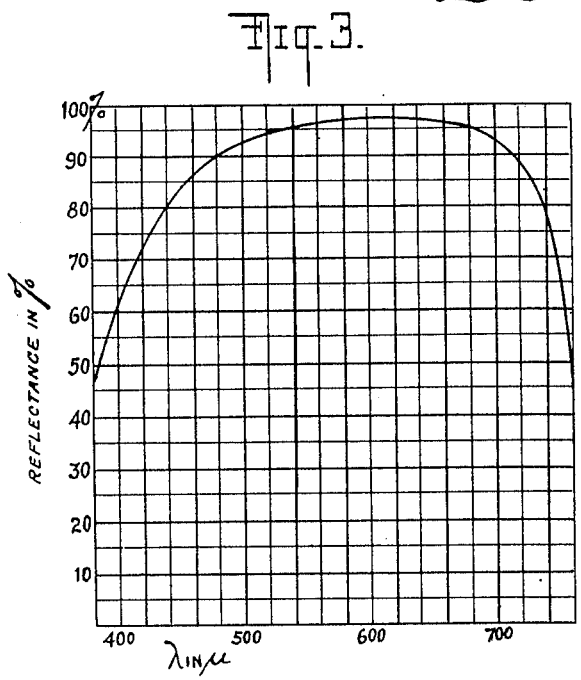
INVENTOR.
HUBERT SCHRÖDER
BY
John J. Hart
ATTORNEY

United States Patent Office

2,700,323
Patented Jan. 25, 1955

---

2,700,323

INFRARED TRANSMITTING MIRROR

Hubert Schröder, Munich, Germany, assignor to Fish-Schurman Corporation, New York, N. Y., a corporation of New York Application December 14, 1949, Serial No. 132,874

Claims priority, application Germany December 27, 1948

3 Claims. (Cl. 88—105)

This invention relates to optical instruments, projection lamps, searchlights and the like, and more particularly to an improved mirror or reflector for use in such devices.

In most optical arrangements and instruments requiring high light intensities, it is necessary to obviate the harmful effect of the unavoidable heat rays emitted by the usual light sources. Heretofore, special glasses which absorb the heat rays in particular have been placed in the path of the rays. Such heat protective glasses apart from causing considerable light absorption and color variation of the transmitted light, suffer from the disadvantage that, due to the heat energy absorbed by them, there is an increase in their temperature to such a degree that they become subject to the danger of cracking. Important progress was made by the introduction of multi-layer interference films which make it possible to reflect infra-red rays almost without influencing the visible rays. However, it has not been possible with this type of selective filters to obtain the reflection of much more than 55–60% of the total heat rays, without also incurring a proportionate light loss in the visible range of the rays.

An object of the invention is to provide a mirror capable of obviating heat rays without being subject to the disadvantages of prior devices for this purpose.

Another object of the invention is to provide an improved mirror means which is capable of weakening the heat rays to greater degree than prior means.

The foregoing objects are achieved in accordance with the invention by introducing into the ray path, one or more deflecting mirrors which, while having the highest possible reflecting capacity for the visible spectrum, are capable of passing rays in the infra-red range. In those cases where luminosity is only a minor requirement, the coating for such deflecting mirrors may comprise materials whose absorption limit lies in the proximity of the red end or region of the visible spectrum, as for instance, metallic selenium. However, should as little light as possible be absorbed, the use of multi-layer interference films offers a special advantage if such films are constructed in such manner that their reflecting power between the violet and red region of the spectrum is high (preferably over 80%) at steep angles, while such power is as low as possible (preferably under 20%) in the adjoining infra-red red region.

A better understanding of the invention as well as other objects and the advantages thereof, will become more apparent after a perusal of the following description when read in connection with the accompanying drawings, in which Fig. 1 is a sectional view illustrating one form of the invention; Fig. 2 is a similar view showing another way of practicing the invention, and Fig. 3 is a graph showing the reflectance characteristics of a mirror constructed in accordance with the invention.

In Fig. 1 of the drawings, the reference numeral 10 designates the support body which may be made of transparent or other suitable materials. For the purposes of illustration, the support 10 is indicated as being made of a transparent or optical glass member. Deposited in alternate relation on the transparent base 10 are layers of high and low refractive indices and non-absorbing or weakly absorbing layers; the layers of high refractive index being indicated by the numerals 11 and the layers of low refractive index being indicated by the numerals 12. Each of layers 11 and 12 possess an optical thickness of about one-quarter of the medium wave length of the visible spectrum (about 550 millimicrons). However, with this simplest type of multi-layer interference films, it is still necessary to take into account a certain residual transparency for the visible light in one or both ends or regions of the visible speectrum, which may cause a slight color shading of the reflected light. Such materials as are absorbent in the short wave region of the visible spectrum are more suitable, as for instance, antimony sulfide, whereby the thickness of the layers may be increased on order to shift the reflection maximum more toward the red region. Only a few layers suffice to achieve a total reflecting power of 90–95% in the visible spectrum, while in the adjoining infra-red a transparency of up to 90% may be obtained, inasmuch as said infra-red contains the heat rays passed through ordinary glass. Also, two systems of the kind described, with partly absorbing or non-absorbing layers, whose optical thicknesses differ slightly and which contain between them a transparent layer of at least three times the thickness of a single layer, furnish good mirrors in accordance with this invention.

As an example of the foregoing, the layers designated 11 in Fig. 1 of the drawings, may be made of antimony sulphide, and the layers 12 may be made of cryolite, so that the compound film begins and ends with $Sb_2S_3$. Each of the $Sb_2S_3$ layers 11 and the cryolite layers 12 have an optical thickness of one-quarter wave lengths for green-blue photometer-filter, the top or last $Sb_2S_3$ layer 11 being preferably somewhat thinner. Reflection power of the mirror constructed in accordance with Fig. 1 is 90%, while its transmission is from 1 to 3% for white light, measured with photocell of about spectral eye sensitivity. If an additional cryolite layer 12 and $Sb_2S_3$ layer 11 is included in the composite film, making nine layers in all, transparency of infrared region which passed through the glass 10 is at least 85%. Fig. 3 shows the reflectance characteristics of a nine layer mirror made in accordance with the invention and without protection. Looking through the filter, color must be deep red to purple. This layer composition is resistant to temperatures up to 200° C., but is sensitive to scratches. On the glass side, the reflection is somewhat less. If the surfaces are protected by a lacquer, such as the layer 13 of colorless burning lacquer, the reflection decreases about 7%. To increase the reflection in the short wave region of the spectrum, thallium sulphide can be useed advantageously in place of the first $Sb_2S_3$ layer.

The same build-up of layers using $MgF_2$ instead of cryolite, will produce very resistant layers, but the reflection power will be lower by a few percent as compared with the above described build-up. In the use of $MgF_2$, the optical layer thicknesses therefore must be reduced by 10% compared with $Sb_2S_3$. This can be accomplished very readily by using two photometer filters with corresponding spectral difference for $MgF_2$ and $Sb_2S_3$. The last $Sb_2S_3$ layer can be protected by the use of a one-half wave length layer of $MgF_2$, $ThOF_2$ or similar hard material, such layer corresponding to the previously described layer 13.

Resistance to high temperatures combined with great mechanical resistance and optical qualities (the mirror is absolutely free of color), can be produced in the manner illustrated in Fig. 2 of the drawings. In such figure, the numeral 10' designates the glass base, upon which are deposited in alternate relation, four layers 14 of a material of high refractive index, such as ZnS and three layers 15 of a material of low refractive index, such as cryolite or $MgF_2$. Each of layers 14 and 15 have an optical thickness of about one-quarter of the visible wave length of the visible spectrum. Upon the seven layers there is deposited a layer 16 of low refractive index such as $MgF_2$, and having an optical thickness of three half-wave lengths. Upon layer 16 is deposited seven more one-quarter wave length thick layers similar in arrangement to the first mentioned seven layers and in which the numerals 17 designate the layers of high refractive index, such as ZnS, and the numerals 18 designate the layers of low refractive index such as MgF₂. To suppress the small transmission bands which are always possible in such combinations, the one-quarter wave thickness of the first alternating layer system (layers 14 and 15) should differ by from 10 to 20% from the second alternating layer system (layers 17 and 18). It is an important advantage of this system that it shows on the glass side nearly the same reflection as on the air side.

The layer arrangements above described are particularly advantageous in all cases where the use of reflecting mirrors is required initially. This is particularly the case when the beam of rays in an instrument must be bent in order to save space, as for instance, in reading instruments. A further application of the invention is its use, for example, as mirror coating in reflectors, projection lamps, searchlights and the like, whereby damage to the parts of the apparatus due to reflected heat may be avoided. The use of interference films as a mirror coating further includes the possibility of producing linearly polarized light simultaneously with the reflection at the deflection mirror. It is essential for this purpose to choose the layers in such manner that the resulting amplitude $R_i$ of the reflection vector becomes as small as possible in a definite incident angle range, $i$ indicating either the component parallel or vertical to the incident plane. The subscript $k$ represents a generic term for the expansion in the formula. This requirement is expressed mathematically as follows:

$$R_i = r_1 + r_2 e^{-j\Delta_1} + r_3 e^{-j(\Delta_1 + \Delta_2)} + \cdots + r_g e^{-j(\Delta_1 + \Delta_2 + \cdots + \Delta_m)} \sim 0; j = \sqrt{-1}$$

where $\Delta_k$ is the phase difference, $r_k$ the reflection coefficient of the $k$th layer in relation to the $(k+1)$th layer; and $r_g$ the reflection coefficient of the base against the $m$th (last) layer. The incident angle for the deflecting mirror in this case is preferably large so that a sufficiently high value for the other polarization component $R_i{'}$ will result, i. e., at least about 50° (angle of incidence).

I claim:

1. A mirror capable of reflecting the visible rays emitted from a light source and of transmitting heat rays emitted from such source, comprising a transparent supporting body composed of material capable of passing heat rays therethrough and a reflector consisting of a plurality of layers superimposed on a surface of said support, alternate layers of said reflector being of a non-metallic material having a high index of refraction and the remaining layers of said reflector being of a non-metallic material having a low index of refraction, the layer adjacent the supporting body being a high index layer, a plurality of the highly refracting layers of said reflector being composed of antimony sulphide and being absorbent in the short wave region of the visible spectrum and substantially non-absorbent in the near infra-red region, and said high and low refracting alternate layers being otherwise transparent to the major portion of the visible spectrum and having an optical thickness slightly greater than one-quarter of the medium wave length of the visible spectrum to shift the reflection maximum toward the red region of the visible spectrum and such that said reflector passes the major portion of the impinging heat rays therethrough and reflects substantially white light without essential changes in color.

2. A mirror such as defined in claim 1 in which the layer adjacent to said supporting body of the reflector is constituted of thallium sulphide.

3. A mirror such as defined in claim 1, wherein a protective outer layer is provided, said outer layer being transparent and of low index of refraction, and having an optical thickness of approximately one-half wave length of visible light.

References Cited in the file of this patent
UNITED STATES PATENTS

| | | |
|---|---|---|
| 1,425,967 | Hoffman | Aug. 15, 1922 |
| 2,412,496 | Dimmick | Dec. 10, 1946 |
| 2,418,627 | Dimmick | Apr. 8, 1947 |
| 2,519,722 | Turner | Aug. 22, 1950 |